United States Patent [19]

Lackey et al.

[11] 4,276,063
[45] Jun. 30, 1981

[54] GAS SCRUBBING LIQUIDS

[75] Inventors: Walter J. Lackey; Robert S. Lowrie, both of Oak Ridge; John D. Sease, Knoxville, all of Tenn.

[73] Assignee: The United States of America as represented by the United States Department of Energy, Washington, D.C.

[21] Appl. No.: 761,037

[22] Filed: Jan. 21, 1977

Related U.S. Application Data

[63] Continuation-in-part of Ser. No. 577,819, May 15, 1975, abandoned.

[51] Int. Cl.³ .............................................. B01D 47/06
[52] U.S. Cl. ...................... 55/84; 55/DIG 9; 176/37; 176/91 SP; 252/301.1 W; 261/17; 261/DIG. 9
[58] Field of Search ............... 55/84, 71, 68, 66, 64, 55/DIG. 9; 252/301.1 W; 176/37, 91 SP; 261/17, DIG.9

[56] References Cited

U.S. PATENT DOCUMENTS

| 3,390,869 | 7/1968 | Alliger | 261/17 |
| 3,504,481 | 4/1970 | Zakarian et al. | 261/DIG. 9 X |
| 3,762,133 | 10/1973 | Merriman et al. | 55/71 X |
| 3,776,759 | 12/1973 | Ford et al. | 176/91 SP X |
| 3,850,593 | 11/1974 | Beaujean et al. | 55/66 |
| 3,925,039 | 12/1975 | Ziegler | 261/DIG. 54 X |

FOREIGN PATENT DOCUMENTS 41-20760 12/1966 Japan .......................................... 55/66

OTHER PUBLICATIONS

Mellan, I. *Industrial Solvents Handbook*, N.J., Noyes Data Corp., 1970, p. 50.
*Kirk-Othmer Encyclopedia of Chemical Technology*, 2nd ed., 1964, John Wiley & Sons, Inc. vol. 14, pp. 81-83.
Sarnoff, P. *Encyclopedic Dictionary of the Environment*, N.Y., Quadrangle Books Inc., 1971. pp. 118, 119, 122, 287, 1971.

*Primary Examiner*—Kathleen J. Prunner
*Attorney, Agent, or Firm*—Allen H. Uzzell; David S. Zachry; James F. Denny

[57] ABSTRACT

Fully chlorinated and/or fluorinated hydrocarbons are used as gas scrubbing liquids for preventing noxious gas emissions to the atmosphere.

8 Claims, 1 Drawing Figure

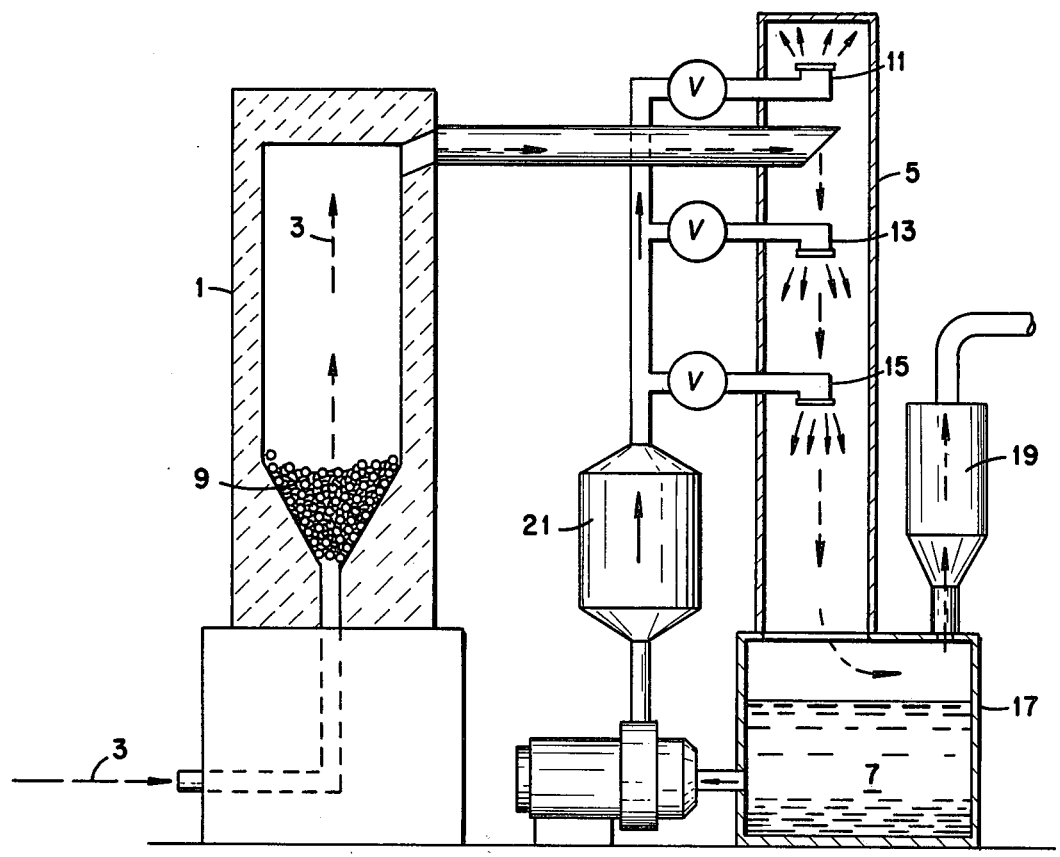

GAS SCRUBBING LIQUIDS

BACKGROUND OF THE INVENTION

This invention was made in the course of, or under, a contract with the Energy Research and Development Administration. It relates generally to the art of gas scrubbing and more particularly to the liquids used as gas scrubbing agents.

CROSS-REFERENCE TO RELATED APPLICATION

This application is a continuation-in-part of U.S. patent application Ser. No. 577,819 filed May 15, 1975, now abandoned.

In the prior art various systems and techniques have been devised for reducing or eliminating the noxious contaminants produced as by-products of industrial processes. Of particular interest are the contaminants which are released to the atmosphere as a result of combustion. These contaminants are of the type which are normally released from a stack in the form of what is normally referred to as smoke. Smoke, depending upon its source, may contain suspended particulates, hydrocarbon vapors, soot, and aerosols.

Soot has been removed from effluent stream by filters. Hydrocarbon vapors including tars, however, are not affected by a filter and condense on the filter to clog the same or pass on through unremoved. Another method of soot removal involves burning the soot with an excess of air. However, this creates further emission for which some technique of abatement is needed.

In general, the use of water scrubbers has solved many of these problems. Water, however, still does not act as a solvent for many hydrocarbon vapors and thus either permits these vapors to pass on through to the atmosphere or to condense at some undesirable point within the system.

In the nuclear processing industry, the avoidance of hydrogen bearing material is of particular importance because of the neutron moderating properties of hydrogen. Thus, it is unwise to use an aqueous gas scrubber on a system containing fissionable material. The possibility of the scrubbing liquid flooding the system and creating a critical mass condition is remote, but such possibility should be avoided if at all possible. Aqueous scrubbers are thus unsatisfactory for systems containing fissionable material.

SUMMARY OF THE INVENTION

It is thus an object of this invention to provide a new class of scrubbing liquids for eliminating noxious stack emissions.

It is a further object of this invention to provide a novel class of gas scrubbers which act as solvents for hydrocarbon vapors.

It is a still further object of this invention to provide a novel liquid for scrubbing gases which is non-hydrogenous.

These as well as other objects are accomplished by a process wherein fully chlorinated and/or fluorinated hydrocarbons are used as gas scrubbing liquids.

BRIEF DESCRIPTION OF THE DRAWING

The single FIGURE of drawing schematically illustrates a gas scrubber for use with the scrubbing liquid of this invention.

DETAILED DESCRIPTION

According to this invention it has been found that fully chlorinated and/or fluorinated hydrocarbons have remarkably effective properties for scrubbing noxious contaminants from a gas stream. In general, these properties are:
(1) high solubility for hydrocarbons;
(2) heat capacity of greater than 0.2 Cal/gm°C.;
(3) low flammability;
(4) boiling point of greater than 75° C.; and
(5) capacity to wet soot.

Thus, in accordance with this invention, it has been found that fully chlorinated and/or fluorinated hydrocarbons possessing the above listed properties are capable of scrubbing noxious effluents from combustion gases with a higher efficiency than water while at the same time avoiding the use of hydrogen bearing material in nuclear material processing.

While the term fully chlorinated and/or fluorinated hydrocarbon is used in describing the scrubbing liquids of this invention, the perchloro and perfluoroalkenes are the liquids of principal interest within the scope of this invention. More particularly, the scrubbing liquids embodied within the scope of this invention include perchloro-ethylene, hexachloropropylene, perchlorobutadiene, tris perfluoro-butylamine, perfluoroacetone, perfluoro-ethers, and perfluoro-thioethers.

The scrubbing liquids embodied by this invention have been found to possess scrubbing properties superior to water in the following regards:
(1) hydrocarbon gases and liquids are readily dissolved within the scrubbing liquid in appreciable quantities;
(2) soot is wetted by the scrubbing liquid thus leading to the formation of a soot-solvent slurry;
(3) neutrons are not moderated by the scrubbing liquid since they are non-hydrogenous;
(4) the liquids are non-corrosive.

Of the scrubbing liquids embodied by this invention, perchloro-ethylene is the preferred liquid because of its availability and ease of recovery from a soot slurry by low temperature distillation. Further description will thus be given with reference to the preferred perchloroethylene.

The scrubbing liquids contemplated for use in this invention may, of course, be used in conjunction with any process which produces noxious emissions. These liquids can be substituted for water in any gas scrubbing application. The preferred mode of application, however, is contemplated to be in applications where fissile materials are present in a contiguous relationship to the scrubbing system. In such a situation, the avoidance of moderating material such as hydrogenous material is important for reasons previously mentioned.

The process and scrubbing liquid of this invention is particularly useful in combination with furnaces for coating nuclear fuel particles with carbon. Such a furnace is disclosed in commonly assigned copending application Ser. No. 452,166 filed Mar. 18, 1974, now U.S. Pat. No. 3,889,631. The single figure of drawing illustrates such as coating furnace in combination with a scrubber embodying a scrubbing liquid of this invention. The furnace 1 with flow pattern 3 of decomposable gas is combined with gas scrubber 5 containing perchloroethylene 7 as the scrubbing liquid. Fuel particles 9 are coated with carbon from the decomposition of the hydrocarbon gas in stream 3. The resulting soot, hydrocarbon vapors continue through furnace 1 and into scrubber 5. Spray nozzles 11, 13, and 15 spray perchloroethylene so as to cocurrently contact the emission stream 3. Perchloroethylene falls to reservoir 17 while the gas stream passes through demister 19 and then on to absolute filters (not shown). The perchloroethylene is cooled in heat exchanger 21 prior to recirculation back to the spray nozzles.

In actual operation, gas providing the carbon coating enters the coating furnace at the bottom thereof and acts as a fluidizing medium for the fuel particles. Any effluent gas then passes into the scrubber. This gas is at a temperature of about 600° C. and contains, for example, decomposition products of the pyrolytic decomposition of the coating gas including soot and various hydrocarbons, including long chain species such as tars. Within the scrubber, the coater effluent stream is contacted with several sprays of $C_2Cl_4$ at a temperature of about 20° C., and the combined materials drop into the reservoir which acts as a gas-liquid separator. The gaseous stream therefrom passes through the demister and a cooler (not shown) to remove residual liquids and condensible materials prior to exit through absolute filters. A portion of the $C_2Cl_4$ is removed from the separator by a pump, passed through the heat exchanger, and reinjected through the spray nozzles. The solids and dissolved vapors remain in the $C_2Cl_4$ solution and thus are reinjected into the scrubber. This continues until the solution is loaded sufficiently to warrant regeneration. Perchloroethylene accommodates about 180 grams soot per liter and remains sufficiently fluid to permit pumping and recirculation at soot concentrations of 125 to 150 grams per liter. Regeneration is accomplished by distillation or centrifugation. For a coating furnace having a five-inch diameter, the gas effluent exits at a rate of about 100–500 l/min. A total volume of $C_2Cl_4$ of about 70 liters is sufficient to scrub the gas without overheating of the liquid. The volume flow rate of the liquid corresponding to that of the gas volume flow rate above is within the range of 25 to 50 liters per minute.

The effectiveness of perchloro- and perfluoroalkenes for scrubbing effluent gases is illustrated by the high efficiency of perchloroethylene for removing very fine soot particles and tars from the particle coating furnace effluent gas. When acetylene and/or propylene is decomposed within the furnace, the effluent contains numerous hydrocarbons including long-chain species such as tars as well as 30–50% by weight soot. The soot is present as very fine particles, less than one micron, with the average size being about 0.5 micron as measured by scanning electron microscopy. The effluent gas contains enough of this fine soot to plug an absolute filter in a matter of seconds. Furthermore, experience has shown that the effluent gas contains sufficient tars to plug an absolute filter in about one hour. When the effluent gas stream at about 600° C. was passed downwardly through a spray scrubber where it was contacted with three successive cocurrent sprays of perchloroethylene and then to an absolute filter, the filter remained clean for many hours of operation and lasts for weeks without plugging. Qualitative estimates place the efficiency of the three stage perchloroethylene scrubber at over 99% for this very fine soot. This is particularly significant when it is considered that one manufacturer of spray-type gas filters using conventional scrubbing liquids reports a single stage particle removal efficiency of only about 40% for particles of 0.5 microns, which would correspond to no more than a 79% overall removal efficiency for a three-stage scrubber. Actually the overall efficiency of a three-stage scrubber using prior art liquids would be expected to be less than 79% since the smaller, more difficultly removable particles would escape the first stage and pass to the second and third stages which would then be correspondingly less efficient. Accordingly, it is seen that perchloroethylene is substantially more effective than prior art liquids for removing soot particles from gas streams wherein a major portion (more than 50 percent by weight) of the soot is present as particles smaller than 1 micron in diameter (equivalent sphere diameter).

Perchloroethylene has also been found to be highly effective for removing particulates which are present in the gas stream resulting from coating nuclear fuel particles with SiC coating by the thermal decomposition of chlorinated silanes such as $CH_3SiCl_3$. Typically, pyrolytic carbon-coated particles are coated with SiC in a fluidized bed particle coating furnace as described above using a mixture of $CH_3SiCl_3$, $H_2$, and an inert gas as the fluidizing gas at 1400–1700° C., preferably 1550° C. The deposition of silicon carbide coatings is more fully described in Gas-Cooled Reactor Programs Annual Progress Report, ORNL-4975, Oak Ridge National Laboratory, Oak Ridge, Tenn. (1976). The overall coating reaction is:

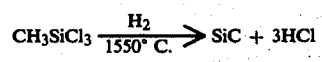

$$CH_3SiCl_3 \xrightarrow[1550°\ C.]{H_2} SiC + 3HCl$$

The rate of coating deposition is proportional to the flow rate of $CH_3SiCl_3$. The coating operation is not 100% efficient and the effluent gas contains about 5–10 percent by weight particulates as well as HCl and $H_2$. The particulates are not crystalline SiC but do contain carbon and silicon. It is believed that the particulates are amorphorous silane polymers. For example, a normal SiC coating operation produced sufficient particulates to plug a 1 in. exhaust line from the 5 in. furnace to an NaOH liquid scrubber after only two three-hour runs of coating SiC from decomposing $CH_3SiCl_3$. When a a one-stage cocurrent spray scrubber using perchloroethylene was installed in the line, it plugged no more than once in fifty-three runs.

An additional advantage to the use of the scrubbing liquids of this invention for nuclear fuel particle coating effluents is that entrained fuel particles can easily be removed from the scrubbing liquid, e.g., by screen filters. This is a substantial advantage over the use of bag filters and the like.

It is thus seen that by the use of the improved scrubbing liquids of this invention hydrocarbon vapors, tars, soot and $CH_3SiCl_3$ decomposition particulates are effectively removed from stack emissions. It is further seen that the scrubbing liquids of this invention have the additional advantage of being non-moderating for use where fissile materials are present.

What is claimed is:

1. In a method of removing contaminants from a gas stream emanating from a fluidized bed particle coating furnace in which nuclear fuel particles are coated with carbon or silicon carbide by the thermal decomposition of a hydrocarbon or a chlorinated silane, said furnace containing fissionable material capable of nuclear criticality in the presence of hydrogenous moderating material, the improvement comprising scrubbing said gas stream with a liquid scrubber consisting essentially of a member selected from the group consisting of perchloroalkenes.

2. The improvement according to claim 1 wherein said scrubber is selected from the group consisting of perchloroethylene, hexachloropropylene and perchlorobutadine.

3. The improvement according to claim 1 wherein said liquid is perchloroethylene.

4. The method of claim 3 wherein said gas stream contains soot, a major portion of said soot present as particles smaller than one micron in diameter.

5. The method of claim 3 wherein said gas stream emanates from a fluidized bed particle coating furnace in which nuclear fuel particles are coated with SiC formed by the thermal decomposition of $CH_3SiCl_3$.

6. The method of claim 1 wherein said gas stream contains soot, a major portion of said soot present as particles smaller than one micron in diameter.

7. The method of claim 1 wherein said gas stream emanates from a fluidized bed particle coating furnace in which nuclear fuel particles are coated with carbon formed by the thermal decomposition of a hydrocarbon.

8. The method of claim 1 wherein said gas stream emanates from a fluidized bed particle coating furnace in which nuclear fuel particles are coated with SiC formed by the thermal decomposition of a chlorinated silane.

* * * * *